No. 679,273. Patented July 23, 1901.
F. M. CHAPPELL.
FEED WATER REGULATOR.
(Application filed Sept. 21, 1900.)
(No Model.) 3 Sheets—Sheet 1.
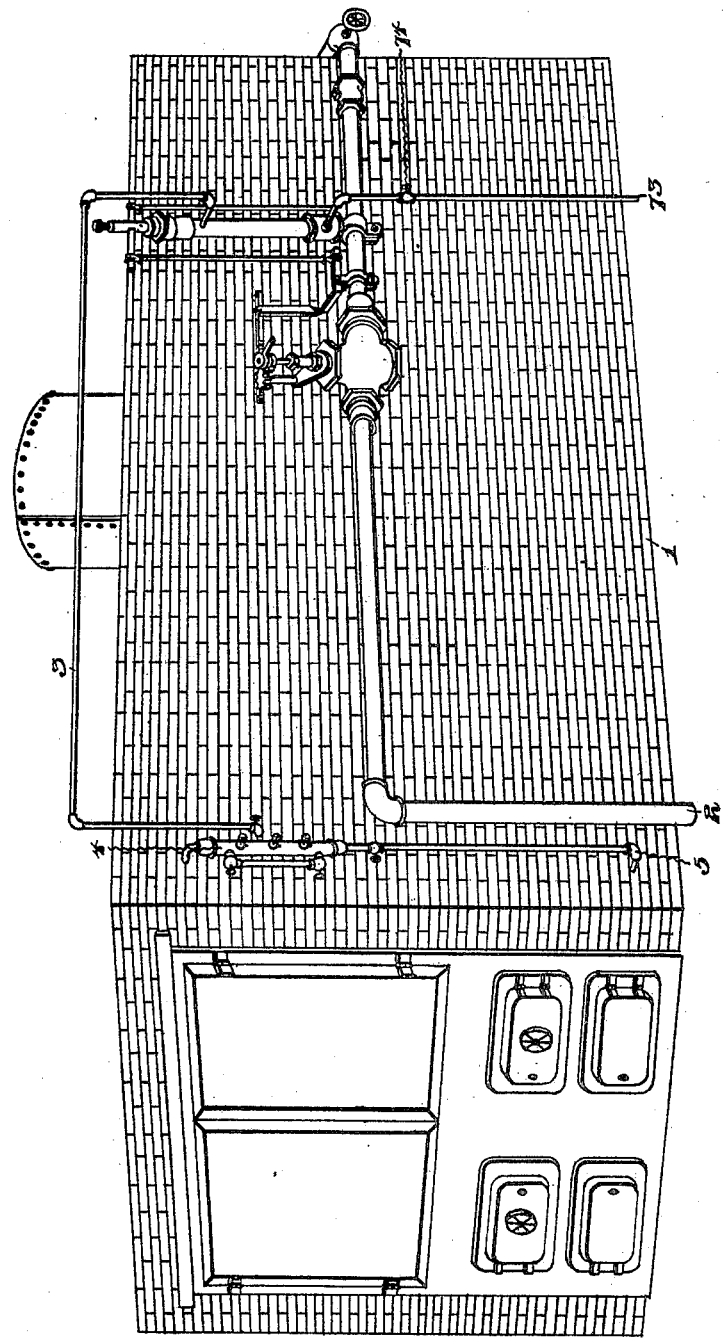

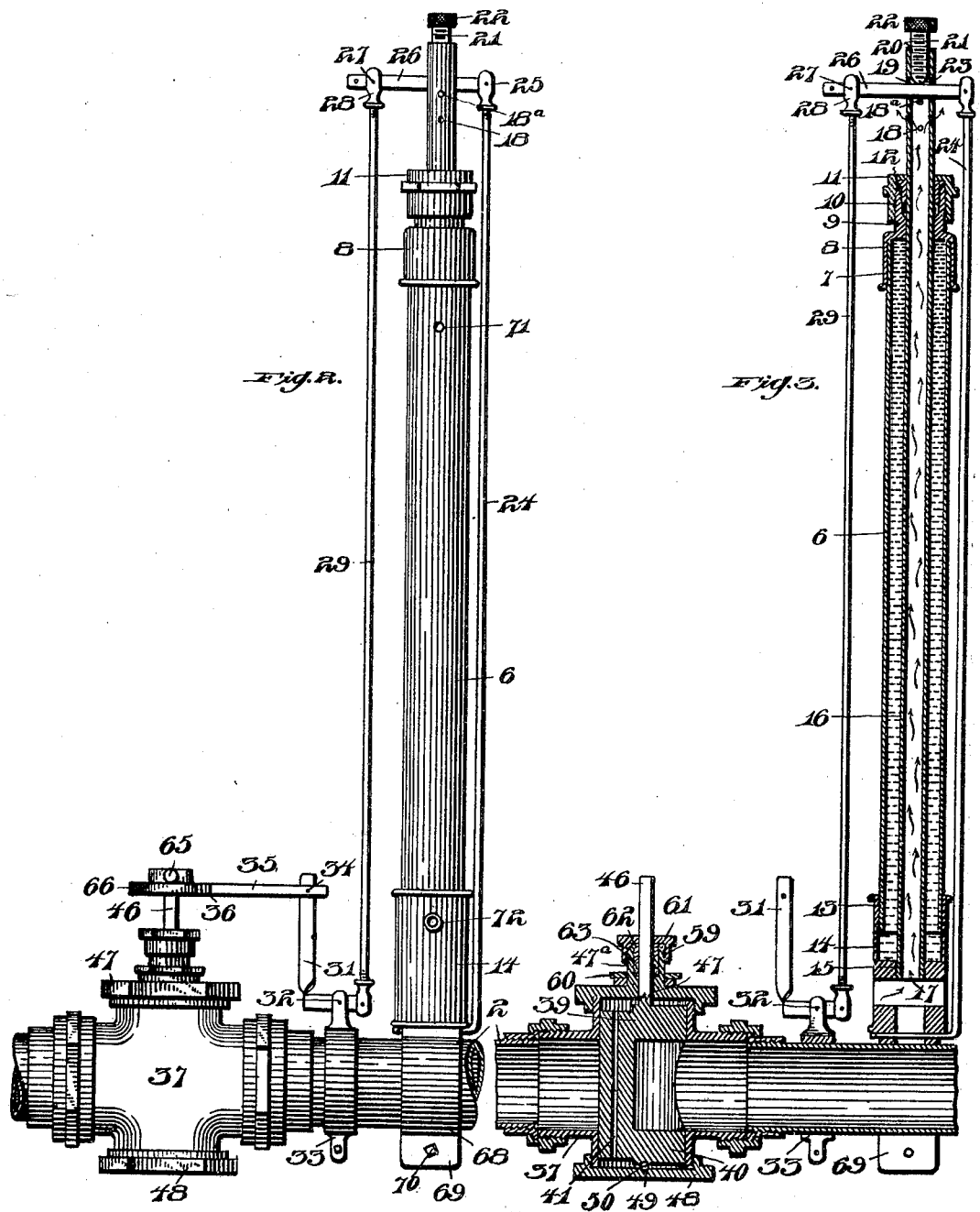

No. 679,273.  
F. M. CHAPPELL.  
FEED WATER REGULATOR.  
(Application filed Sept. 21, 1900.)  
(No Model.)  
Patented July 23, 1901.  
3 Sheets—Sheet 3.
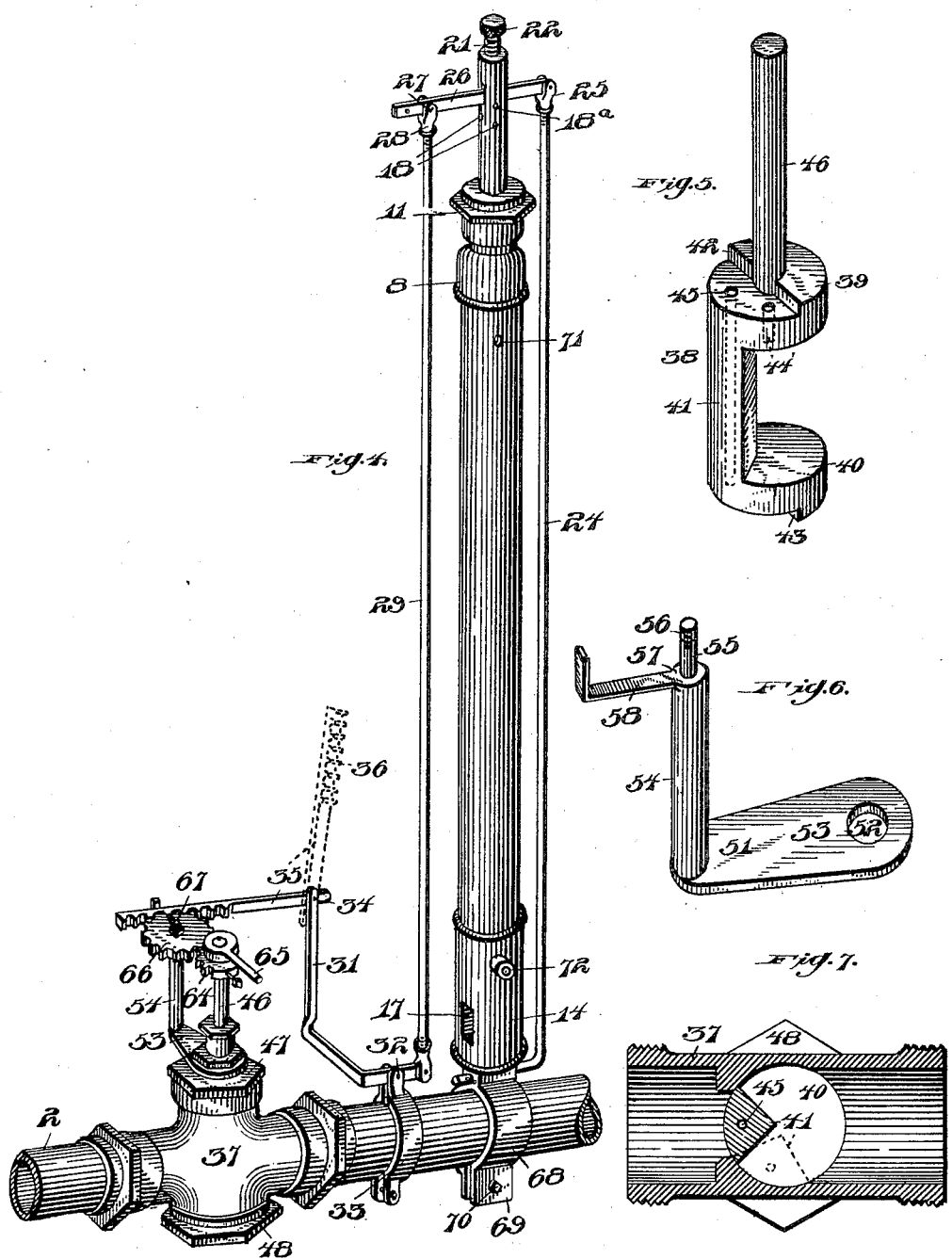

UNITED STATES PATENT OFFICE.

FRANK M. CHAPPELL, OF PITTSBURG, PENNSYLVANIA.

FEED-WATER REGULATOR.

SPECIFICATION forming part of Letters Patent No. 679,273, dated July 23, 1901.

Application filed September 21, 1900. Serial No. 30,685. (No model.)

*To all whom it may concern:*

Be it known that I, FRANK M. CHAPPELL, a citizen of the United States of America, residing at Pittsburg, in the county of Allegheny and State of Pennsylvania, have invented certain new and useful Improvements in Feed-Water Regulators, of which the following is a specification, reference being had therein to the accompanying drawings.

This invention relates to certain new and useful improvements in feed-water regulators, and has for its object the provision of novel means whereby the supply of water in a boiler is regulated to a predetermined or desired point and always retained at this certain level.

The herein-described invention particularly relates to feed-water regulators wherein the water is regulated by thermo means, dispensing with all auxiliary valves and floats, such as are common in this class of machines.

The invention aims to obtain a direct action from the thermostat to the regulating-valve arranged in the feed-water line; furthermore, to provide new and novel means whereby a quick action of the thermostat is obtained— *i. e.*, when there is a change of temperature in the water the effect of the same will be immediately transferred to the regulating-valve, which will operate correspondingly.

The invention further aims to construct a thermostat in such a manner that it will operate upon the regulating-valve, both opening and closing the same, and not depending upon the action of springs, weights, or other appliances.

My improved regulator further contemplates to construct a valve of the rotary type that will be balanced under all conditions of pressure; furthermore, one wherein the slightest movement communicated to the operating means will operate the valve, the latter operating in a free and easy manner at all times.

Another object of my invention is to construct a feed-water regulator that will be extremely simple in its construction, strong, durable, and highly efficient in its operation; furthermore, one that may be manufactured at a comparatively small cost.

With the above and other objects in views the invention consists in the novel construction, combination, and arrangement of parts to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 1 is a perspective view of a steam-boiler having arranged thereto my improved feed-water regulator. Fig. 2 is a side elevation of the thermostat and regulating-valve. Fig. 3 is a vertical sectional view thereof. Fig. 4 is a perspective view of the same. Fig. 5 is a perspective view of the regulating-valve and valve-stem. Fig. 6 is a perspective view of the bracket carrying the idler and having formed integral therewith a guide for the cog-rack arm. Fig. 7 is a horizontal longitudinal sectional view of the valve.

In the drawings the reference-numeral 1 indicates the boiler; 2, the feed-line; 3, the flow-line; 4, the water-column, and 5 the waste-line of the water-column.

The reference-numeral 6 indicates a tubular casing in the thermostat, the latter being screw-threaded at its upper extremity, as shown at 7, for the reception of a screw-threaded cap 8, having an upwardly-extending cup-shaped portion 9, the latter being exteriorly screw-threaded, as at 10, to receive the screw-threaded cap 11. Between said screw-threaded cap 11 in the cup-shaped portion 9 is arranged a packing 12, the lower end of the said casing being likewise screw-threaded, as at 13, to receive a fitting 14, having arranged therein a screw-threaded seat 15 to receive the expansion-tube 16, said fitting being provided with an air-port 17, communicating with said expansion-tube 16, the latter passing upwardly through the screw-threaded cap 8, cup-shaped portion 9, packing 12, and the screw-threaded cap 11 and being provided near its upper extremity with air-passages 18 and also with a transversely-extending opening 19, the upper extremity of said expansion-tube being screw-threaded, as at 20, to receive a set-screw 21, having a head 22 and a lower rounded portion 23.

The reference-numeral 18ª indicates a steel pin secured in the expansion-tube, upon which the connecting-arm 26 rests. Rigidly attached to the fitting 14 is a rod 24, carrying a bifurcated end 25, in which is pivotally secured the connecting-lever 26, extending through the transverse opening 19. The other end of said connecting-lever 26 is pivotally secured at 27 to the bifurcated end 28 of the operating-rod 29, carrying at its lower end a bifurcated end 30, to which is pivotally secured the lever-arm 31, the latter being pivotally connected at 32 to the split collar 33, arranged upon the feed-water line. The upwardly-extending end of said operating-lever 31 is pivotally connected at 34 to the arm 35, carrying a cog-rack 36.

The reference-numeral 37 indicates a valve-casing secured in the feed-line and having arranged therein a valve 38, said valve being formed of an upper disk 39 and a lower disk 40, connected together by means of a V-shaped wall 41.

The reference-numeral 42 indicates a shoulder formed by the cut-away portion in the disk 39, and the reference-numeral 43 indicates a shoulder formed in the corresponding disk 40. An air-port 44 is arranged in the upper disk 39, and a water-passage 45 is formed in the upper disk 39, passing downwardly through the V-shaped wall 41 through the disk 40. A valve-stem 46 is secured to the upper disk 39 and passes upwardly through the screw-threaded head 47, the latter being secured to the valve-casing. A corresponding screw-threaded head 48 is arranged at the bottom of said valve-casing, in which is centrally arranged a recess 49 for the reception of a ball-bearing 50, the latter being partially seated in the under face of the valve. The upper screw-threaded head 47 carries an upwardly-extending sleeve 47ª, upon which is secured a bracket 51, which is attached thereto by means of the aperture 52, formed in the base portion 53 and carrying an upwardly-extending shaft 54, the upper end of said shaft being of less diameter, as shown at 55, carrying screw-threaded portion 56 and forming a shoulder 57 and an outwardly-extending guide 58, all of said parts being formed integral with one another. The upwardly-extending sleeve 47ª is exteriorly screw-threaded, as shown at 59, to receive the jam-nut 60, which serves to retain and securely fasten the bracket, said exteriorly-screw-threaded portion also receiving the screw-threaded cap 61, in which is secured the gland 62, retaining the packing 63 against the valve-stem, the valve-stem passing through said glands, packing, and caps. Near the upper end of the valve-stem is arranged a segmental cog-wheel 64, and above said cog-wheel 64 is secured to the valve-stem a hand-lever 65, the said segmental cog-wheel 64 being adapted to mesh with the cog-idler 66, the latter being mounted upon the end 55 of the shaft 54 and retained in position by a nut 67, secured upon the screw-threaded portion 56 of the end 55. The said cog-idler also meshes with a cog-rack 36.

A split sleeve 68 serves to retain the thermostat upon the feed-line, the latter carrying flanges 69, which are securely bolted together, as shown at 70. The reference-numeral 71 indicates the connection between the flow-line and thermostat, and a nipple 72 forms the connection between the thermostat and waste-pipe 73, in which is secured the waste-valve 74.

Having fully described the various parts of my improved feed-water regulator, I will now first describe the operation and action of the thermostat and then in detail the operation of the regulating-valve.

When a change of temperature takes place from water to steam conducted through the flow-line, the expansion-tube will thereby expand, raising the connecting-arm, carrying with it the operating-rod, communicating movement to the lever-arm, which in turn operates the arm carrying the cog-rack, thereby partially rotating the cog-idler, transmitting movement to the segmental cog-wheel, which in turn partially rotates the valve-stem carrying the valve, thereby further opening the port in the valve-casing and allowing a larger supply of water to pass through the feed-line in the boiler. When the temperature is then changed from steam to water in the thermostat, the reverse action takes place throughout the entire mechanism and the valve is further closed, allowing a smaller quantity of water to be discharged through the regulating-valve or closing the port entirely. It will be noted that an almost instantaneous action of the thermostat will be obtained by reason of the free circulation of air through the expansion-tube, said tube being more quickly cooled than if such tube were formed of a solid bar or closed at one or both of its ends. A free passage and circulation of air through the expansion-tube will tend to cool the said tube more rapidly, and thereby obtain almost an instantaneous action, which will be directly communicated to the regulating-valve, as heretofore described. The walls of the expansion-tube being of smaller diameter, by reason of the central air-passage, will also heat more quickly than in case of the solid tube, and almost an instantaneous action is obtained as a change of temperature from water to steam takes place in the thermostat.

The operation of the regulating-valve is as follows: The pressure of the water being against the converging sides of the V-shaped wall 41 will be forced through the port arranged in the upper disk and thence through the water-passage extending through the V-shaped wall, the pressure being then quickly distributed at the top and bottom of the valve and a back pressure being against the shoulders 42 and 43, thereby producing a perfectly-balanced valve, the free and easy movement of said balance-valve being further facilitated by reason of the ball-bearing arranged in the lower valve-seat, which assures a free and easy rotary movement.

It will be observed that the valve as heretofore described possesses many advantages, as the same is particularly adapted to operate under all conditions of pressure and qualities of water, thereby overcoming many difficulties that now exist in this class of valves.

From the above description it will be readily apparent that many advantages are obtained by the use of my improved apparatus, which provides new and novel means whereby a direct action is obtained and exercised upon the regulating-valve controlling the feed-water supply, and when a change of temperature takes place in the thermostat will give a direct action upon the regulating-valve without the intervention of auxiliary valve or like means to accomplish the desired result. More accurate means of regulating the water-level in a boiler is thus obtained, and the employment of auxiliary valves, which are common to this class of machines, will be entirely obviated, thereby overcoming a very objectionable feature which can be found in many machines of this character. Multiplicity of parts and the liability of the same becoming out of order are hazardous, and in many instances dangerous and disastrous results follow. All such objectionable features are practically overcome by the use of the herein-described apparatus, and I have found in actual practice that more satisfactory results have been obtained by the use of my improved apparatus.

It will be noted that various changes may be made in the details of construction without departing from the general spirit of my invention.

Having thus fully described my invention, what I claim as new, and desire to secure by Letters Patent, is—

1. The combination with a boiler, of a thermostat having a central air-passage, a feed-line, a valve therein, a toothed wheel on the valve-stem, a bell-crank lever, a cog-rack actuated thereby, a connection between the cog-rack and the toothed wheel and means whereby the thermostat oscillates the bell-crank lever.

2. The combination with a boiler, of a thermostat having a central air-passage, a bell-crank lever operated by the thermostat, a feed-line having a valve, a cog-wheel on the stem of the valve, a cog-rack pivoted to the bell-crank lever and means whereby the motion of the cog-rack is imparted to the cog-wheel of the valve-stem.

3. In combination with a boiler, of a thermostat, a bell-crank lever operated by the thermostat, a cog-rack pivoted to the bell-crank lever, a bracket having a guide-arm on which the cog-rack is slidable, a cog-idler mounted on a spindle formed on the bracket, a feed-line, a valve therein, a cog-wheel on the valve-stem meshing with the cog-idler and means for attaching the bracket to the valve-casing, substantially as described.

4. In an apparatus of the character described, in combination with a boiler, a feed-pipe, a regulating-valve arranged in said feed-pipe, a flow-pipe, a thermostat having air-passages arranged therein, and means interposed between said thermostat and said regulating-valve to open and close said valve by the direct action of the thermostat, as specified.

5. In an apparatus of the character described, the combination with a boiler, of a feed-pipe, a regulating-valve arranged in said feed-pipe, a flow-pipe, a thermostat having arranged therein a central air-passage, a waste-pipe connected to said thermostat, and a waste-controlling valve arranged in said waste-pipe, all parts being arranged and operating substantially as described.

6. In an apparatus of the character described, the combination with a boiler, a feed-pipe, a rotary regulating-valve arranged in said feed-pipe, a thermostat connected to said flow-pipe and having arranged therein a central air-passage and ports, and means interposed between said thermostat and said rotary regulating-valve whereby a direct action is obtained from said thermostat to open and close said rotary regulating-valve, substantially as described.

7. In a feed-water regulator, the combination with a boiler, a feed-line, a flow-line, a thermostat interposed between said flow-line and feed-line, said thermostat containing an expansion-tube having a central air-passage and air-ports therein, a rod arranged on the side of said thermostat, a connecting-rod, an operating-rod, a lever, an arm carrying a cog-rack, a cog-idler, a segmental cog-wheel mounted on a valve-stem, a rotary balanced valve arranged upon said valve-stem operating in a suitable valve-casing and arranged in said feed-line, all parts being arranged and operating substantially as described and for the purpose set forth.

8. In combination, a boiler, a thermostat in communication therewith, said thermostat having a casing and an expanding tube provided with means for permitting the circulation of air through the tube, and means operated by the thermostat for controlling the feeding of water to the boiler.

9. In combination, a thermostat in communication with a boiler, said thermostat comprising a casing containing an expanding tube with means for permitting the circulation of air through the tube, and means operated by the thermostat for controlling the feeding of water to the boiler.

10. In combination, a thermostat having connections with a boiler, said thermostat comprising a casing and an expansion-tube, and means for permitting the circulation of air through the tube, a feed-pipe, a controlling-valve therein and means operated by the thermostat for varying the position of the valve.

11. The combination with a boiler, of a thermostat having a central air-passage, a flow-pipe, a feed-line, a rotary valve in the feed-line, a toothed wheel on the valve-stem, a bell-crank lever, a cog-rack actuated thereby, a connection between the cog-rack and toothed wheel and means whereby the thermostat oscillates the bell-crank lever.

12. The combination with a boiler, of a thermostat comprising a casing communicating with the boiler, a tube in the casing, and means for admitting air to the tube, a feed-pipe having a valve, a cog-rack, connections between the cog-rack and the valve-stem, whereby said valve-stem is partially rotated, a bell-crank lever for actuating the cog-rack and means whereby the bell-crank is reciprocated by the expanding tube of the thermostat.

13. The combination with a boiler, of a thermostat comprising a casing in communication with the boiler and an expansion-tube in the casing a feed-pipe, a valve therein, a cog-wheel on the stem of the valve, a cog-rack, a connection between the cog-wheel and the cog-rack, a bell-crank lever to which the cog-rack is pivoted and suitable connections between the thermostat and the bell-crank lever.

14. The combination with a boiler, of a thermostat in communication with the boiler, a valve-casing having a sleeve, a bracket having apertures to receive the sleeve, a nut for securing the bracket in place; said bracket having a reduced end and guide, an idle cog-wheel on the reduced end, a cog-rack slidable in the guide in engagement with the idle cog-wheel, a cog-wheel on the valve-stem taking motion from the idle cog-wheel and means connected to the thermostat for actuating the cog-rack.

15. The combination with a boiler, of a thermostat, a valve, a cog-wheel on the valve-stem, a bracket supported on the valve-casing having a guide, a cog-rack slidable in the guide, suitable connections whereby the movement of the cog-rack is communicated to the valve-stem, and connections whereby the movement of the thermostat actuates the cog-rack.

In testimony whereof I affix my signature in the presence of two witnesses.

FRANK M. CHAPPELL.

Witnesses:
JOHN NOLAND,
H. C. EVERT.